(12) United States Patent
Kitamura

(10) Patent No.: US 8,037,174 B2
(45) Date of Patent: Oct. 11, 2011

(54) SIGNALING SERVER, DATA COMMUNICATION SYSTEM, SIGNALING PROCESSING PROXY METHOD AND PROGRAM

(75) Inventor: Tsutomu Kitamura, Minato-ku (JP)

(73) Assignee: NEC Corporation, Tokyo (JP)

( * ) Notice: Subject to any disclaimer, the term of this patent is extended or adjusted under 35 U.S.C. 154(b) by 155 days.

(21) Appl. No.: 12/367,065

(22) Filed: Feb. 6, 2009

(65) Prior Publication Data
US 2009/0216870 A1 Aug. 27, 2009

(30) Foreign Application Priority Data
Feb. 26, 2008 (JP) ................. 2008-045001

(51) Int. Cl.
*G06F 15/173* (2006.01)
*G06F 9/46* (2006.01)

(52) U.S. Cl. .................... 709/224; 718/105

(58) Field of Classification Search .......... 709/223, 709/224; 718/105
See application file for complete search history.

(56) References Cited

U.S. PATENT DOCUMENTS

| | | | |
|---|---|---|---|
| 7,245,405 B2 * | 7/2007 | Friedman et al. | 358/425 |
| 7,254,610 B1 * | 8/2007 | Turner et al. | 709/204 |
| 7,348,904 B2 * | 3/2008 | Christoffersson et al. | 341/106 |
| 7,417,943 B2 * | 8/2008 | Mutch | 370/202 |
| 7,765,325 B2 * | 7/2010 | Liu et al. | 709/247 |
| 2006/0034212 A1 * | 2/2006 | Mutch | 370/328 |
| 2006/0262812 A1 * | 11/2006 | Liu et al. | 370/477 |
| 2008/0020775 A1 * | 1/2008 | Willars | 455/445 |
| 2008/0227459 A1 * | 9/2008 | O'Neill et al. | 455/439 |
| 2008/0267219 A1 * | 10/2008 | Christoffersson et al. | 370/477 |
| 2009/0274090 A1 * | 11/2009 | Akhtar et al. | 370/328 |
| 2009/0311996 A1 * | 12/2009 | Furuta | 455/414.2 |

FOREIGN PATENT DOCUMENTS

| | | |
|---|---|---|
| JP | 11-122251 A | 4/1999 |
| JP | 11-187068 A | 7/1999 |
| JP | 2002-189707 A | 7/2002 |
| JP | 2004-032176 A | 1/2004 |
| JP | 2005-020286 A | 1/2005 |
| JP | 2005-080249 A | 3/2005 |

OTHER PUBLICATIONS

Lars-Erik Jonsson, "RFC 4163: Robust Header Compression (ROHC): Requirements on TCP/IP Header Compression", [online], Aug. 2005, IETF, [Searched on Feb. 14, 2008], <URL: http://www.ietf.org/rfc/rfc4163.txt>.

M. Garcia-Martin, et al., "RFC 3845: The Session Initiation Protocol (SIP) and Session Description Protocol (SDP) Static Dictionary for Signaling Compression (SigComp)", [online] Feb. 2003, IETF, [Searched on Feb. 14, 2008], <URL: http://www.ietf.org/rfc/rfc3485.txt>.

* cited by examiner

*Primary Examiner* — Jerry Dennison
(74) *Attorney, Agent, or Firm* — Sughrue Mion, PLLC

(57) ABSTRACT

To provide a data communication system which lightens processing related to changes in the status in signaling processing performed between terminals. A signaling server communicating mutually with a plurality of terminals includes: a transmitting/receiving part for transmitting/receiving a message; a status management part for updating a registered terminal list and status management information; and a signaling processing part for judging a destination and a type of the message received at the transmitting/receiving part. The signaling processing part gives an instruction to the status management part to update the status management information in accordance with contents of the message without transferring the message to a first terminal, when the first terminal requires the signaling processing support and the message is not directly related to starting or stopping of communication with the first terminal.

16 Claims, 10 Drawing Sheets

FIG. 5

| TERMINAL ADDRESSES | STATUS INFORMATION | TIMER INFORMATION |
|---|---|---|
| ADDRESS 1 (TERMINAL 3a) | STATUS A | 60 SEC., PERIODICAL, MEASURED DATA TRANSMISSION |
| : | : | : |
| : | : | : |

FIG. 6

| TERMINAL ADDRESSES | SIGNALING PROCESSING SUPPORT REQUEST FROM TERMINALS |
|---|---|
| ADDRESS 1 (TERMINAL 3a) | YES |
| ADDRESS 2 (TERMINAL 3b) | NO |
| ⋮ | ⋮ |

SIGNALING SERVER, DATA COMMUNICATION SYSTEM, SIGNALING PROCESSING PROXY METHOD AND PROGRAM

CROSS-REFERENCE TO RELATED APPLICATION

This application is based upon and claims the benefit of priority from Japanese patent application No. 2008-045001, filed on Feb. 26, 2008, the disclosure of which is incorporated herein in its entirety by reference.

BACKGROUND OF THE INVENTION

1. Field of the Invention

The present invention relates to a data communication system using a network. More specifically, the present invention relates to a method for reducing amount of CPU processing performed in terminals and amount of message data transmitted/received to/from the terminals in signaling processing.

2. Description of the Related Art

As one of major research themes in ubiquitous techniques, there is the so-called sensor network. The sensor network is a technique with which a plurality of terminals (referred to as sensor terminals hereinafter) having sensors (sensors for temperature, humidity, oscillation, acceleration, position, voice, for example) are formed in a radio network, and condition of a specific range is to be judged in a comprehensive manner based on information from each sensor. It is expected apply the sensor networks to various fields.

The sensor terminal is provided with very simple computer resources (referred to as resources hereinafter) such as a processor, a memory, and a radio module along with a sensor so as to be able to participate in a radio network. In order to employ a sensor network, it is necessary to form a network with an enormous number of sensor terminals. Thus, the cost of the sensor terminals occupies a large proportion of the total cost when building a work and life support system. Therefore, it is necessary for the sensor terminals to reduce the resources to be loaded thereon as much as possible in order to cut the cost.

In the meantime, for the sensor terminals to perform data communication, it is necessary to perform signaling between the sensor terminals or between the sensor terminals and a host computer or the like to exchange a communication parameter that is required for a specific communication protocol. However, existing communication protocols such as SIP (Session Initiation Protocol) are developed supposedly for high-spec terminals having abundant resources, such as personal computers and work stations.

Therefore, regarding the conventional sensor terminals, there is a limit in cutting the cost by reducing the resources since it is necessary to secure the resources for enabling communications performed with an existing communication protocol. In order to cut the cost for the sensor terminals, it is necessary to reduce the data amount and the processing amount in signaling so as to be processed by the terminals with the reduced resources.

Meanwhile, a technique for reducing the data amount of messages exchanged between the terminals in signaling is disclosed in following documents. A Document (Non-Patent Document 1: Lars-Erik Jonsson, "RFC 4163: Robust Header Compression (ROHC): Requirements on TCP/IP Header Compression" [online], August 2005, IETF, [Searched on Feb. 14, 2008] <URL: http://www.ietf.org/rfc/rfc4163.txt>) discloses ROHC (Robust Header Compression) algorithm that is a message header compression technique. Another Document (Non-Patent Document 2: M. Garcia-Martin et al., "RFC 3845: The Session Initiation Protocol (SIP) and Session Description Protocol (SDP) Static Dictionary for Signaling Compression (SigComp)", [online] February 2003, IETF, [Searched on Feb. 14, 2008] <URL: http://www.ietf.org/rfc/rfc3485.txt>) discloses Sig Comp (Signaling Compression) algorithm which compresses the entire message with a text-base signaling protocol such as SIP.

Japanese Unexamined Patent Publication 2002-189707 (Patent Document 1) discloses a technique in which a server judges types of a plurality of data devices and operating conditions, and distributes data according to those. Japanese Unexamined Patent Publication 2004-032176 (Patent Document 2) discloses a technique which reduces data amount by extracting base data from a plurality of numerical value data and calculating a difference value with respect to the base data. Japanese Unexamined Patent Publication 2005-020286 (Patent Document 3) discloses a technique in which a network management device transmits device information through performing signaling between terminals and the network management device in accordance with registration requests from the terminals.

Japanese Unexamined Patent Publication 2005-080249 (Patent Document 4) discloses a technique in which terminals registered to a communication supporting device exchange data with each other safely. Japanese Unexamined Patent Publication 11-122251 (Patent Document 5) discloses a technique in which a message exchange device in an ATM communication system holds call setting control information so as to shorten the time required for communication controls. Japanese Unexamined Patent Publication 11-187068 (Patent Document 6) discloses a technique which reduces the number of giving headers by transmitting data with a common header.

In signaling processing performed between terminals, status of the terminals themselves change every time the terminals exchange a request and a response for the request. Processing related to the changes in the status is a burden particularly for the terminals with reduced resources, which therefore is an obstacle for reducing the resources of the terminals.

However, all the methods disclosed in Non-Patent Documents 1, 2 and Patent Documents 2, 6 are to reduce the data amount of a message exchanged between the terminals in signaling by compressing the data of the message. With theses methods, burden imposed due to changes in the status described above cannot be lightened. In addition, the processing amount is rather increased by the processing performed for compression and decompression. Further, there is no structure mentioned in the Patent Documents 1 and 3-5 for lightening the burden related to the changes in the status.

SUMMARY OF THE INVENTION

It is therefore an exemplary object of the invention to provide a signaling server, a data communication system, a signaling processing proxy method and its program, which can lighten the processing related to changes in status in signaling processing performed between terminals.

In order to achieve the foregoing exemplary object, the signaling server according to an exemplary aspect of the invention is a signaling server which mutually communicates with a plurality of terminals via a network, and the server includes: a transmitting/receiving part for transmitting/receiving a message via the network; a storage unit for storing a registered terminal list that is information regarding whether or not each of the plurality of terminals requires a signaling processing support and for storing status management information of the plurality of terminals; a status management part for updating the registered terminal list and the status management information; and a signaling processing part for judging a destination and a type of the message received at the transmitting/receiving part. The signaling processing part judges whether or not a first terminal requires the signaling processing support and whether or not communication state of the first terminal changes by the message, and gives an instruction to the status management part to update the status management information in accordance with contents of the message without transferring the message to the first terminal when judging that the first terminal requires the signaling processing support and the message is not directly related to starting or stopping of communication with the first terminal.

In order to achieve the foregoing exemplary object, the data communication system according to another exemplary aspect of the invention is a data communication system in which a plurality of terminals and a signaling server communicate with each other via a network. The server includes: a transmitting/receiving part for transmitting/receiving a message via the network; a storage unit for storing a registered terminal list that is information regarding whether or not each of the plurality of terminals requires a signaling processing support and for storing status management information of the plurality of terminals; a status management part for updating the registered terminal list and the status management information; and a signaling processing part for judging a destination and a type of the message received at the transmitting/receiving part. The signaling processing part judges whether or not a first terminal requires the signaling processing support and whether or not communication state of the first terminal changes by the message, and gives an instruction to the status management part to update the status management information in accordance with contents of the message without transferring the message to the first terminal when judging that the first terminal requires the signaling processing support and the message is not directly related to starting or stopping of communication with the first terminal.

In order to achieve the foregoing exemplary object, the signaling processing proxy method according to still another exemplary aspect of the invention is a method for allowing a signaling server, which is mutually connected to a plurality of terminals via a network and has a registered terminal list and status management information of the plurality of terminals, to act as a proxy for performing signaling processing when the plurality of terminals perform data communication with each other. The method includes: a receiving step for receiving a message directed to a first terminal from a second terminal; a searching step for searching the first terminal from the registered terminal list; a first judgment step for judging whether or not the first terminal requires a signaling processing support based on contents searched in the searching step; following the first judgment step, a second judgment step for judging whether or not communication state of the first terminal changes by the message; and a status management step for updating the status management information without transferring the message to the first terminal, when it is judged in the first judgment step that the first terminal requires the signaling processing support and judged in the second judgment step that the message is not directly related to starting or stopping of communication with the first terminal.

In order to achieve the foregoing exemplary object, the signaling processing proxy program according to still another exemplary aspect of the invention is a program for allowing a signaling server, which is mutually connected to a plurality of terminals via a network for performing data communication and has a registered terminal list and status management information of the plurality of terminals, to execute: receiving processing for receiving a message directed to a first terminal from a second terminal; searching processing for searching the first terminal from the registered terminal list; first judgment processing for judging whether or not the first terminal requires a signaling processing support based on contents searched in the searching processing; following the first judgment processing, second judgment processing for judging whether or not communication state of the first terminal changes by the message; and status management processing for updating the status management information without transferring the message to the first terminal, when it is judged in the first judgment processing that the first terminal requires the signaling processing support and judged in the second judgment processing that the message is not directly related to starting or stopping of communication with the first terminal.

BRIEF DESCRIPTION OF THE DRAWINGS

FIG. 5 is a conceptual diagram showing a data structure of status management information disclosed in FIG. 2;

FIG. 6 is a conceptual diagram showing a data structure of a registered terminal list disclosed in FIG. 2;

DETAILED DESCRIPTION OF THE EXEMPLARY EMBODIMENTS

Figure 1:
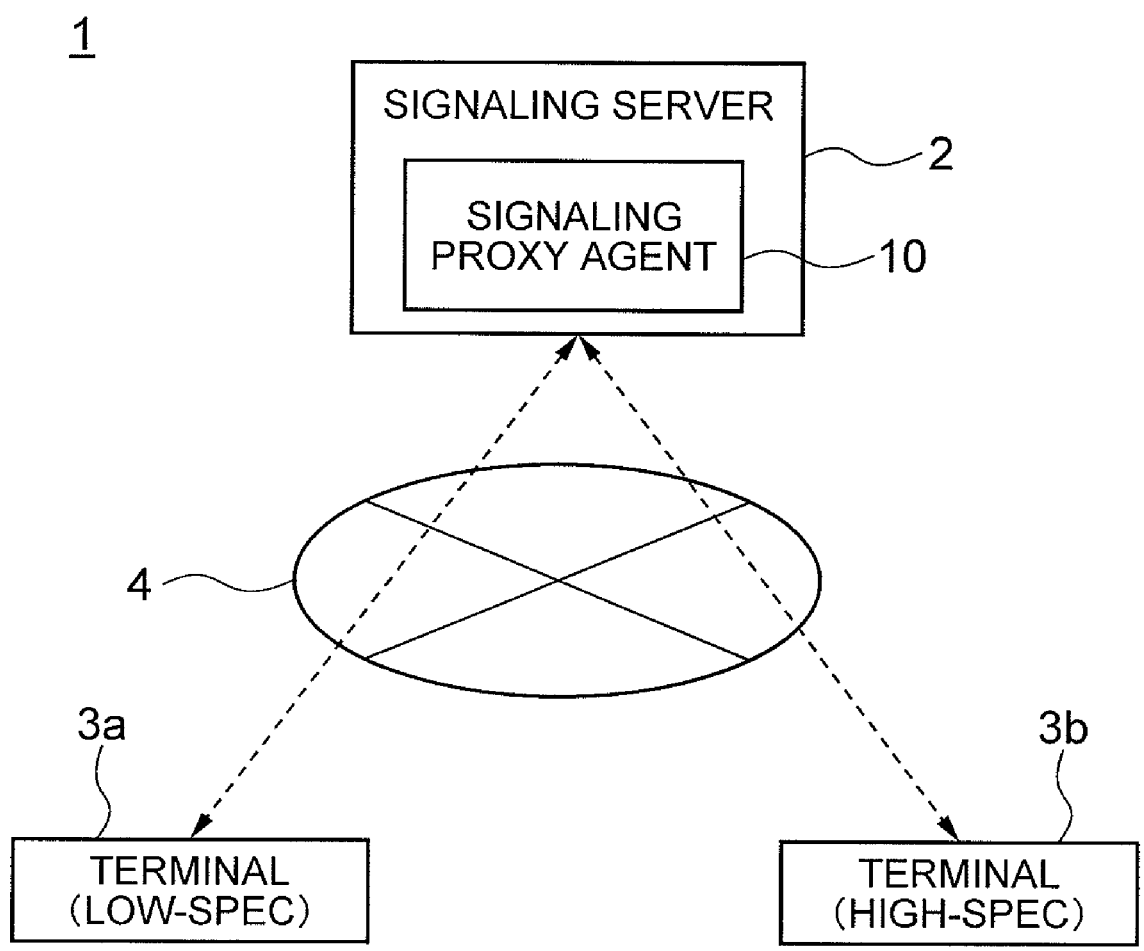
FIG. 1 is a conceptual diagram showing a network structure of a data communication system according to an exemplary embodiment of the invention.

FIG. 1 is a conceptual diagram showing a network structure of a data communication system according to an exemplary embodiment of the invention. In the data communication system 1, a plurality of terminals 3a, 3b, - - - (referred to as terminals 3 as a whole hereinafter) are connected to a signaling server 2 via a network 4. The signaling server 2 is a computer unit having abundant resources, and a signaling proxy agent 10 operates on that. The signaling proxy agent 10 is structured as software that is operated in the signaling server 2.

Figure 2:
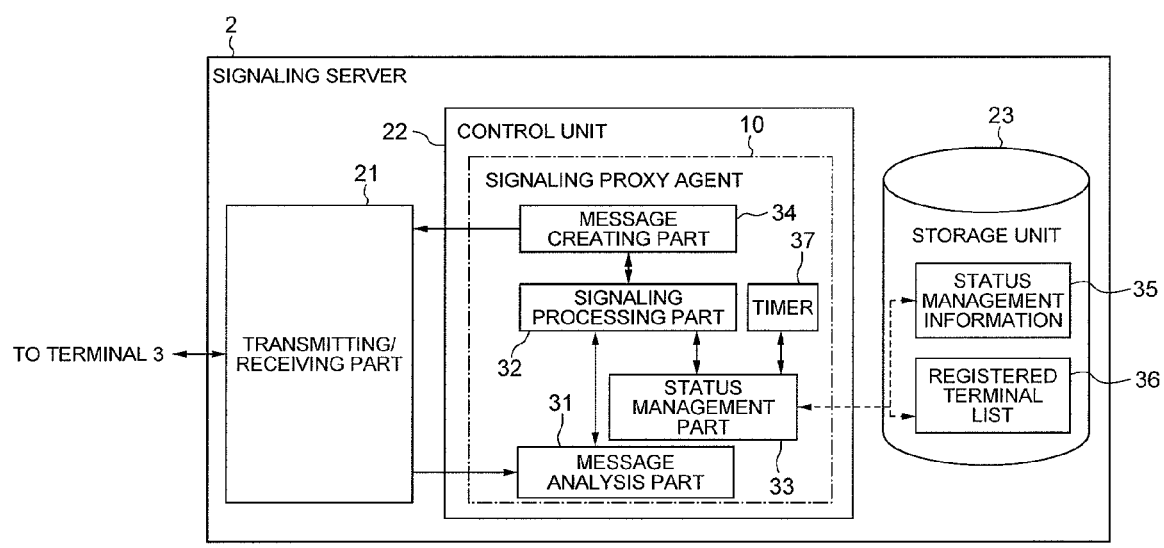
FIG. 2 is a block diagram showing structures of a signaling server and a signaling proxy agent disclosed in FIG. 1.

FIG. 2 is a block diagram showing the structures of the signaling server 2 and the signaling proxy agent 10 disclosed in FIG. 1. The signaling server 2 is configured with a transmitting/receiving part 21, a control unit 22 for executing the signal proxy agent 10, and a storage unit 23 such as a disk device for storing information. The control unit 22 is the heart of the computer, which is configured with a CPU, a main memory, an OS, and the like.

The signaling proxy agent 10 performs communications with the terminals 3 via the transmitting/receiving part 21 by having the control unit 22 execute each function of a message analysis part 31, a signaling processing part 32 including a status management part 22, a message creating part 34, and a timer 37. Further, each piece of information such as status management information 35 and a registered terminal list 36 is stored in the storage unit 23.

The transmitting/receiving part 21 transmits/receives messages via the network 4. The transmitting/receiving part 21 receives a message arrived from the network 4, transfers the received message to the message analysis part 31, and also transmits a message created by the message creating part 34 to the network 4.

The message analysis part 31 parses the message received at the transmitting/receiving part 21, identifies the type of the message, obtains the communication parameter, and informs the obtained message type and the communication parameter to the signaling processing part 32.

The signaling processing part 32 performs signaling processing based on the message type and the communication parameter obtained by the message analysis part 31. Further, when it is found as a result of the signaling processing that it is necessary to transmit a response message or a new message, the message type and the communication parameter of the transmission message is informed to the message creating part 34. The communication parameter contains an address of the sender side of the communication and address of the receiver side (these addresses are referred to as sender/receiver addresses as a whole hereinafter).

At this point, the signaling processing part 32 judges whether or not there is a same address as the sender/receiver addresses contained in the informed communication parameter within the registered terminal list 36. When there is a same address, the status management part 33 performs terminal signaling processing support for the terminal of that address, in addition to performing regular signaling processing. Here, it is assumed that the message is transmitted from the terminal 3b to the terminal 3a, and the address of the terminal 3a corresponds to an address (sender/receiver address) that is judged to be in the registered terminal list 36.

With this terminal signaling processing support, the status management part 33 executes proxy management of the status in the signaling procedure of the terminal 3a, and stores the status management information of the terminal 3a according to the message received from the terminal 3b. The status management part 33 informs the message creating part 34 to transmit a temporary response message to the terminal 3b according to the status of the terminal 3a via the signaling processing part 32.

Further, when the terminal 3a has registered the timer information for data transmission in advance, the status management part 33 acts as a proxy for performing timer management of the terminal 3a, generates a timer event by the timer 37 based on the timer information registered in advance, and transmits a data transmission request to the terminal 3a when the timer event occurs.

The message creating part 34 creates a message in accordance with the message type and the communication parameter informed by the signaling processing part 32, and informs the created message to the transmitting/receiving part 21 to have it transmitted.

The status management information 35 stores the address of the terminals whose registration requests are received in advance, the status information of the terminals, and the timer information used for dispatching data by the terminals. The registered terminal list 36 stores the addresses of the terminals from which the registration request is received, and information regarding the presence of the signaling processing support for each terminal. The contents of the information stored in the status management information 35 and the registered terminal list 36 will be described later.

Figure 3:
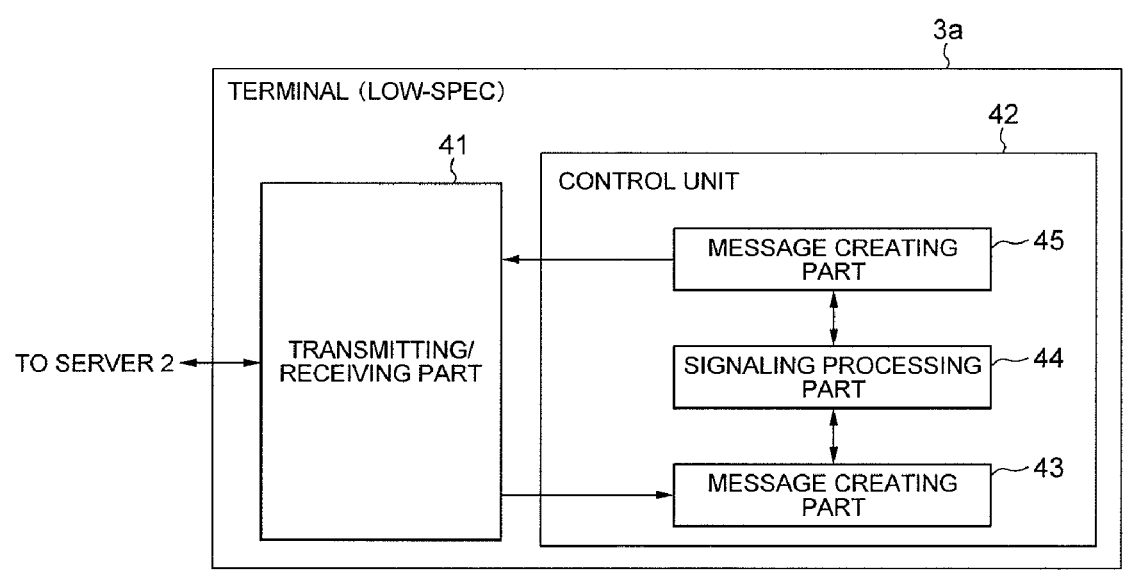
FIG. 3 is a block diagram showing a structure of a low-spec terminal disclosed in FIG. 1.

FIG. 3 is a block diagram showing the structure of the terminal 3a disclosed in FIG. 1. The terminal 3a is a low-cost terminal that has simple resources, so that the terminal 3a may also be called a low-spec terminal 3a. Note here that hardware such as a sensor for detecting information, which is an exchange target of the terminal 3a, is not included as the target of the present invention. Also, its usage is not limited only to the sensor terminal, so that depiction thereof is omitted.

The terminal 3a has a transmitting/receiving part 41 and a control unit 42, and the control unit 42 executes a message analysis part 43, a signaling processing part 44, and a message creating part 45. The transmitting/receiving part 41, the control unit 42, the message analysis part 43, and the message creating part 45 have the same functions as those under the same names of the signaling server 2, except that there is a difference regarding the performances of each part. Further, the signaling processing part 44 has the same functions as that of the same name in the signaling server 2, except that it has no function of the status management part 33. Therefore, explanations of each part in the terminal 3a will be omitted.

Figure 4:
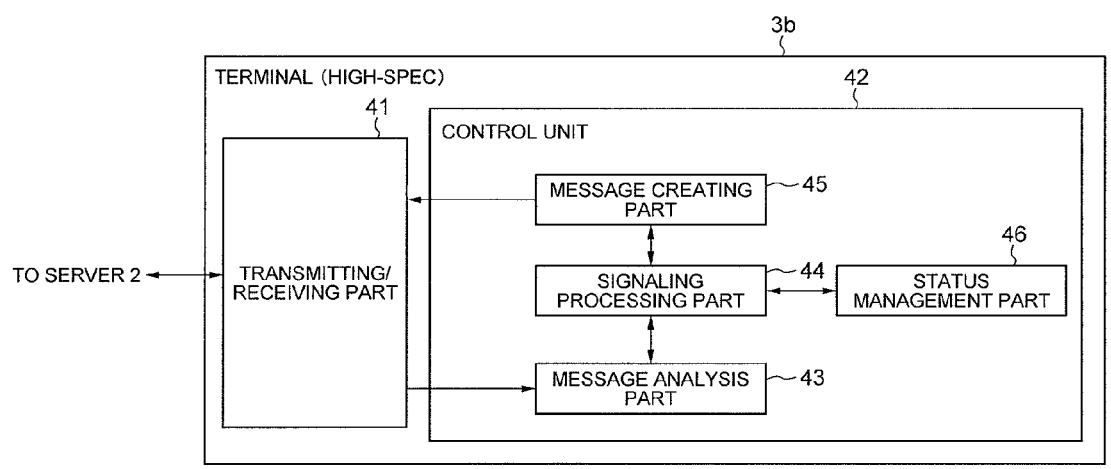
FIG. 4 is a block diagram showing a structure of a high-spec terminal disclosed in FIG. 1.

FIG. 4 is a block diagram showing the structure of the terminal 3b disclosed in FIG. 1. The terminal 3b includes abundant resources such as a widely-used PC or a portable terminal, so that the terminal 3b may also be called a high-spec terminal 3b. The inside structure of the terminal 3b is the same as that of the terminal 3a, except that there is a difference in the performances of each part. However, the signaling processing part 44 of the terminal 3b has a status management part 46 which performs status management of the own terminal, which is not performed in the terminal 3a. There is no more difference between the terminal 3b and the terminal 3a other than those described herein, so that further explanations will be omitted.

FIG. 5 is a conceptual diagram showing the data structure of the status management information 35 disclosed in FIG. 2. The status management information stores terminal addresses 101 of the terminals from which a signaling processing support is requested at the time of registering the terminals in advance, status information 102 of each terminal, and timer information 103 in which data transmission timing of each terminal is written. The contents thereof and operations will be described later.

FIG. 6 is a conceptual diagram showing the data structure of the registered terminal list 36 disclosed in FIG. 2. The registered terminal list 36 stores terminal addresses 111 that are the addresses of the terminals that have requested registration to the signaling server 2 and signaling support presence 112 that is information regarding the presence of the signaling processing support request for each terminal. The contents thereof and operations will be described later.

Figure 7:
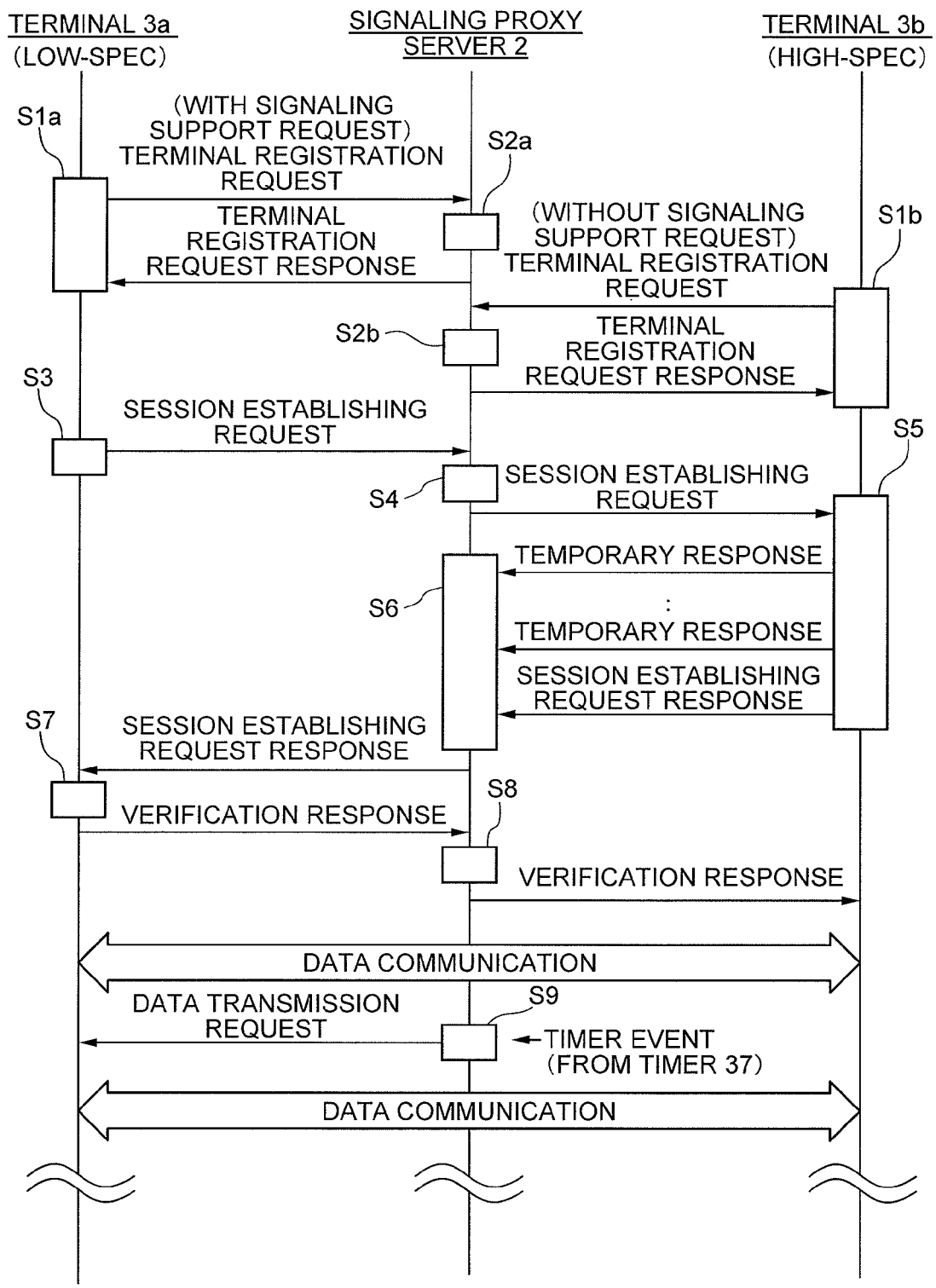
FIG. 7 is a sequence chart showing a communication procedure of the data communication system disclosed in FIG. 1.

FIG. 7 is a sequence chart showing the procedure of the communication performed in the data communication system 1 disclosed in FIG. 1. When connecting to the network 4, the terminal 3 transmits a terminal registration request to the signaling server 2 (steps S1a and S1b). At this time, the terminal 3 writes to the registration request message whether or not to request a support for the signaling processing such as the status processing and the timer processing to the signaling server 2, and writes the timer information when requesting the support.

Here, it is assumed that the low-spec terminal 3a requests a support for the signaling processing, and the high-spec terminal 3b does not request a support. The terminal registration request transmitted from the terminal 3a in step S1a contains a signaling processing support request and timer information corresponding to the request. The terminal registration request transmitted from the terminal 3b in step S1b does not contain a signaling processing support request.

In the signaling server 2 that has received the terminal registration request, the status management part 33 stores the information regarding the terminal from which the registration request is received to the registration terminal list 36 (steps S2a and S2b). The terminal address 111 and the signaling processing support presence 112 are stored in the registered terminal list 36. Here, the signaling processing support 112 of address 1 that is the address of the low-spec terminal 3a in the terminal addresses 111 is recorded as "YES", and the signaling processing support 112 of address 2 that is the address of the high-spec terminal 3b in the terminal addresses 111 is recorded as "NO".

Further, regarding the terminal that has requested the signaling processing support, the terminal address 101, the status information 102, and the timer information 103 are stored in the status management information 35. The status information 102 is information that shows the signaling processing state in each terminal, such as "Calling" or "Proceeding" in SIP, for example.

Here, the terminal address 101, the status information 102, and the timer information 103 of the address 1 (low-spec terminal 3a) that has requested the signaling processing support are stored. Those of the address 2 (high-spec terminal 3b) are not stored in the status management information 35, since it has not requested the signal processing support.

At this point, the terminal 3a transmits a session establishing request for establishing a session with the terminal 3b (step S3). The session establishing request contains communication parameter information such as a media that can be used by the terminal 3a at the time of performing data communication, and it is sent to the signaling server 2 first. Upon receiving the session establishing request, the signaling server 2 updates the status information regarding the terminal 3a stored in the status management information 25, and transfers the session establishing request to the terminal 3b that is the receiver side of the establishing request (step S4).

When the terminal 3b receives the session establishing request, the terminal 3b transmits a temporary response for informing the pre-stage device (the signaling server 2 in this case) that it is in the signaling processing, such as "100 Trying" or "180 Ringing" in SIP, for example, to the signaling server 2 once or more. Further, the terminal 3b checks the communication parameter information written in the session establishing request from the terminal 3b, and returns the communication parameter information, from which the communication parameter that cannot be used by the terminal 3b is deleted, by writing it to a session establishing request response (step S5).

Upon receiving the temporary response from the terminal 3b, the status management part 33 of the signaling server 2 updates the status information 102 of the terminal 3a contained in the status information 35 according to the signaling protocol. However, the terminal 3a normally does not perform processing related to the status management for the temporary response that triggers transition of the status information 102 of the terminal 3a (the signaling processing support 112 in the registration terminal list 36 is "YES"). Therefore, the signaling server 2 does not transfer the temporary response to the terminal 3a.

Upon receiving the temporary response from the terminal 3b, the signaling server 2 updates the status management information of the terminal 3a according to the signaling protocol as in the case of the temporary response. The session establishing request response is a trigger for the terminal 3a to start data transmission, so that the session establishing request response is transferred to the terminal 3a (step S6).

Upon receiving the session establishing request response from the signaling server 2, the terminal 3a transmits a confirmation response to the signaling server 2 and starts data communication with the terminal 3b (step S7). Upon receiving the confirmation response, the signaling server 2 updates the status management information of the terminal 3a according to the signaling protocol, and transfers the confirmation response to the terminal 3b (step S8).

In a case where the terminal 3a requests a timer management processing support regarding the data transmission timing to the signaling server 2 at the time of requesting the terminal registration, the timer information 103 is recorded in the status management information 35. In this case, the signaling server 2 acts as a proxy for executing the timer management processing of the terminal 3a. Waiting time, type of the operation, and a message that is to be transmitted to the terminal 3a after the waiting time has passed are stored in the timer information 103. The status management part 33 registers the waiting time to the timer 37, and starts the operation of the timer.

After the registered waiting time has passed, the timer 37 generates an interruption for the status management part 33 (this is called a timer event). When the timer event occurs, the signaling server 2 transmits the message registered to the timer information 103 (data transmission request in this case) to the terminal 3a when it turns to the timing for data transmission of the terminal 3a (step S9). Upon receiving the data transmission request from the signaling server 2, the terminal 3a transmits data to the terminal 3b.

The type of the operation contained in the timer information 103 shows whether the operation in the waiting time is a periodic operation or only one operation. For example, when it is desired for the terminal 3a to obtain data periodically and transmit the data to terminal 3b, the period may be stored as the waiting time in the timer information 103, "periodic operation" may be stored as the type of the operation, and "data transmission request" may be stored as the message type.

Figure 8:
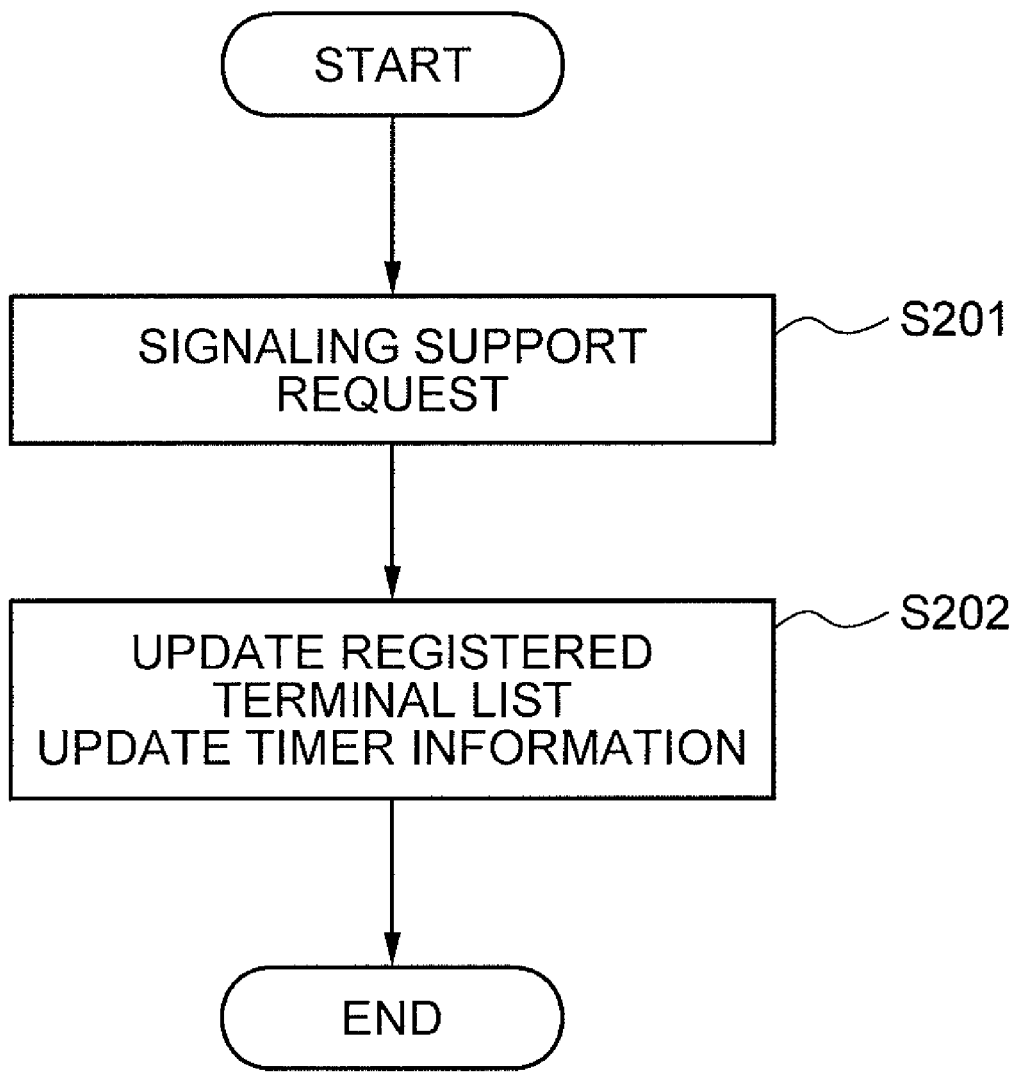
FIG. 8 is a flowchart showing operations of the signaling server when there is a signaling support request received from a terminal in step S2a of FIG. 7.

FIG. 8 is a flowchart showing the operations of the signaling server 2, when it receives the signaling support request from the terminal 3a. When the signaling processing part 32 judges that the message received from the terminal 3a is a signaling support request (step S201), the status management part 33 records the signaling processing support presence 112 corresponding to the terminal address 111 of the terminal 3a as "YES" in the registered terminal list 36 (step S202). At the same time, when the timer information is contained in the signaling processing support request, the status management part 33 stores the timer information as the timer information 103 in the status management information 35.

Figure 9:
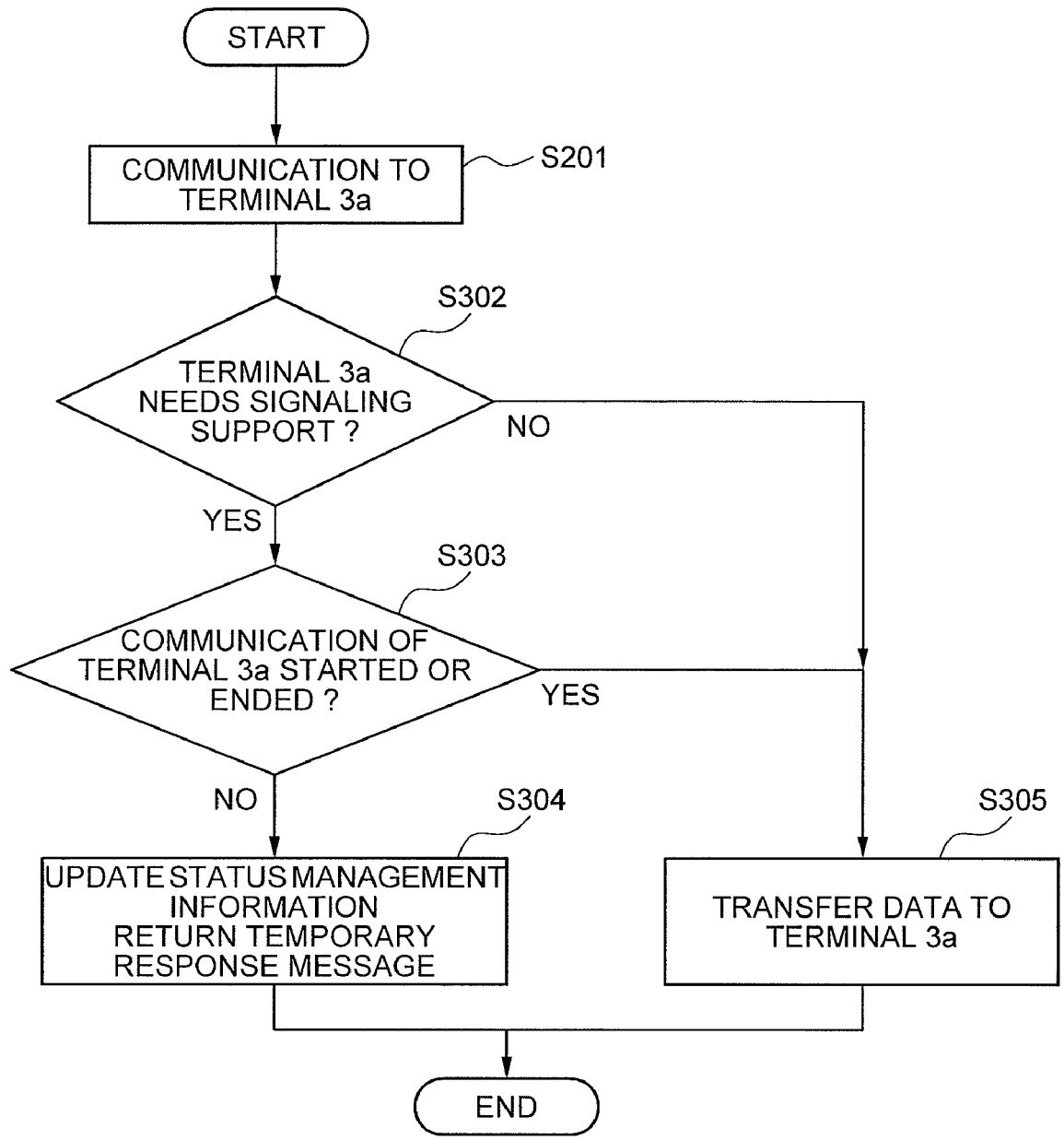
FIG. 9 is a flowchart showing operations of the signaling server when there is a message received from the terminal in step S6 of FIG. 7.

FIG. 9 is a flowchart showing the operations of the signaling server 2, when it receives a message from the terminal 3 in step S6 of FIG. 7. As in steps S5-6 of FIG. 7, it is assumed herein that the signaling server 2 has received a message directed to the terminal 3a from the terminal 3b (step S301).

The signaling processing part 32 judges the signaling processing support presence 112 corresponding to the terminal address 111 of the registered terminal list 36, regarding the terminal 3a to which the message is directed (step S302). If the signaling processing support presence 112 is "NO", it means that no signaling support is necessary. Therefore, the signaling processing part 32 transfers the message as it is to the terminal 3a (step S305).

If the signaling processing support presence 112 is "YES" in step S302, it is then judged whether the type of the message is directly related to starting or stopping of the data communication of the terminal 3a (step S303). The status management part 33 stores the basis of the judgments and executes the judgments. When judged that it requires a change in the communication state, the signaling processing part 32 also transfers the message as it is to the terminal 3a (step S305).

When it is judged in step S303 that it is the message that require no change in the communication state of the terminal 3a, the status management part 33 updates the status management information 35 without transferring the message to the terminal 3a (step S304). Further, a temporary response is transmitted as necessary to the terminal 3b that is the sender of the message.

Figure 10:
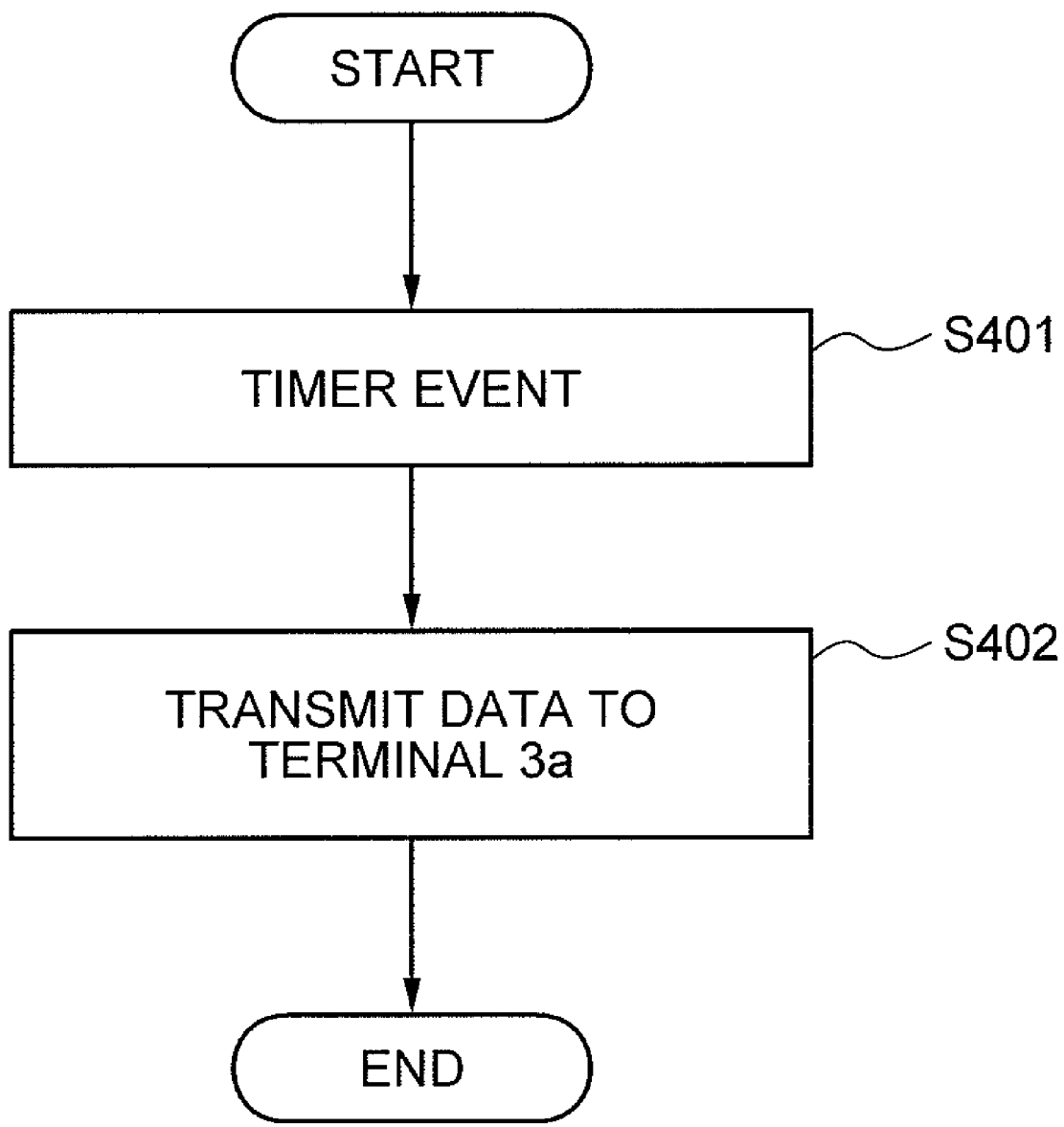
FIG. 10 is a flowchart showing operations of the signaling server when there is a timer event generated in step S9 of FIG. 7.

FIG. 10 is a flowchart showing the operations of the signaling server, when there is a timer event generated in step S9 of FIG. 7. When the timer 37 generates an interruption (timer event) to the status management part 33 (step S401), the signaling processing part 32 transmits a message that is registered in advance to the time information 103 to the terminal 3a (step S402).

As described above, the signaling server 2 acts as a proxy for performing the processing related to the status management of the low-spec terminal 3a, and determines whether or not to transfer the message to the terminal 3a in step S303 based on the status information 102 that is stored in the status management information 35. More specifically, only the message directly related to starting or stopping of the data communication of the terminal 3a is transferred from the signaling server 2 to the terminal 3a, and the message for informing the status of the other signaling processing is not transferred. The type of the message that is transferred to the terminal 3a can be determined arbitrarily.

With this exemplary embodiment, the arithmetic processing amount in the terminal can be reduced by having the signaling server act as a proxy for performing the processing related to the status management and the timer. Further, other than transmitting the signaling processing support request to the signaling server, there is no additional processing performed on the terminal side. What is more, processing for compressing and expanding the data is not executed by the terminal. Therefore, the exemplary embodiment can be easily performed even with low-price terminals whose resources are reduced, which means that the exemplary embodiment has a preferable structure for cutting the cost of such terminals.

Further, the number of transfer messages to the terminal can be decreased by having the signaling proxy agent act as a proxy for performing the status management processing. Therefore, the exemplary embodiment also exhibits an effect of achieving reduction in the band use amount by the terminal at the same time.

Note here that SIP mentioned in the above explanations is presented merely as an example of protocols that are used in general, and the present invention can be used with other protocols as well. Further, while the present invention is suitably used with low-price terminals whose resources are reduced, the type of the terminals is not limited only to the sensor terminals and the like of a sensor network. For example, the present invention can also be used with terminals which perform speech communication by VoIP that is one of applications of SIP, i.e., so-called IP telephones.

The present invention is so structured that the signaling server acts as a proxy for performing the processing related to changes in the status for the terminals that require the signaling processing support. Therefore, it is not necessary for the terminals to perform such processing. This makes it possible to provide excellent data communication, signaling server, data communication method, and data communication program capable of lightening the processing related to the changes in the status in the signaling processing performed between the terminals, which cannot be achieved with conventional techniques.

While the present invention has been described by referring to a specific exemplary embodiment shown in the drawings, the present invention is not limited only to the exemplary embodiment described with the drawings. It is needless to say that any known structures can be employed as long as the effects of the present invention can be achieved.

INDUSTRIAL APPLICABILITY

The present invention can be used in a network that is configured with terminals which perform data communications. The types of the protocols as well as the types of the terminals and data are not particularly limited.

What is claimed is:

1. A signaling server which mutually communicates with a plurality of terminals via a network, the server comprising:
 a transmitting/receiving part for transmitting/receiving a message via the network;
 a storage unit for storing a registered terminal list that is information regarding whether or not each of the plurality of terminals requires a signaling processing support and for storing status management information of the plurality of terminals, including a first terminal; and
 a control unit comprising:
  a status management part for updating the registered terminal list and the status management information;
  a signaling processing part for judging a destination and a type of the message received at the transmitting/receiving part; and
  a hardware processor coupled to the status management part and the signaling processing part, wherein
 the signaling processing part judges whether or not the first terminal that is the destination of the message requires the signaling processing support and whether or not the type of the message changes a communication state of the first terminal, and gives an instruction to the status management part to update the status management information of the first terminal stored in the storage unit in accordance with contents of the message without transferring the message to the first terminal when judging that the first terminal requires the signaling processing support and the message is not directly related to starting or stopping of communication with the first terminal.

2. The signaling server as claimed in claim 1, wherein, when the signaling processing part does not transfer the message to the first terminal, the signaling processing part gives an instruction to the status management part to update the status management information in accordance with the contents of the message and, at the same time, returns a temporary response to a second terminal that is a sender of the message.

3. The signaling server as claimed in claim 2, wherein, in response to the first terminal requiring the signaling processing support, the signaling processing part gives an instruction to the status management part to update the registered terminal list indicating that the first terminal requires the signaling processing support.

4. The signaling server as claimed in claim 2, wherein:
the status management part is provided with a timer for generating a timer event according to timer information that is contained in the status management information; and
the signaling processing part transmits a message by responding to the timer event.

5. The signaling server as claimed in claim 4, wherein the signaling processing part has the status management part record the timer information in the status management information by responding to the signaling processing support request received from the first terminal and the timer information.

6. A data communication system in which a plurality of terminals and a signaling server communicate with each other via a network, wherein
the server comprises:
a transmitting/receiving part for transmitting/receiving a message via the network;
a storage unit for storing a registered terminal list that is information regarding whether or not each of the plurality of terminals requires a signaling processing support and for storing status management information of the plurality of terminals, including a first terminal; and
a control unit comprising:
a status management part for updating the registered terminal list and the status management information;
a signaling processing part for judging a destination and a type of the message received at the transmitting/receiving part; and
a hardware processor coupled to the status management part and the signaling processing part, wherein
the signaling processing part judges whether or not the first terminal that the message is directed to requires the signaling processing support and whether or not the type of the message changes a communication state of the first terminal, and gives an instruction to the status management part to update the status management information of the first terminal stored in the storage unit in accordance with contents of the message without transferring the message to the first terminal when judging that the first terminal requires the signaling processing support and the message is not directly related to starting or stopping of communication with the first terminal.

7. The data communication system as claimed in claim 6, wherein, when the signaling processing part does not transfer the message to the first terminal, the signaling processing part gives an instruction to the status management part to update the status management information in accordance with the contents of the message and, at the same time, returns a temporary response to a second terminal that is a sender of the message.

8. The data communication system as claimed in claim 7, wherein, in response to the first terminal requiring the signaling processing support, the signaling processing part gives an instruction to the status management part to update the registered terminal list indicating that the first terminal requires the signaling processing support.

9. The data communication system as claimed in claim 7, wherein:

the status management part is provided with a timer for generating a timer event according to timer information that is contained in the status management information; and
the signaling processing part transmits a message by responding to the timer event.

10. The data communication system as claimed in claim 9, wherein the signaling processing part has the status management part record the timer information in the status management information by responding to the signaling processing support request received from the first terminal and the timer information.

11. A signaling processing proxy method for allowing a signaling server, which is mutually connected to a plurality of terminals via a network and has a registered terminal list and status management information of the plurality of terminals, including a first terminal, to act as a proxy for performing signaling processing when the plurality of terminals perform data communication with each other, the method comprising:
receiving a message directed to the first terminal from a second terminal;
searching the first terminal from the registered terminal list;
judging whether or not the first terminal requires a signaling processing support based on contents searched in searching the first terminal from the registered terminal list;
after judging whether or not the first terminal requires a signaling processing support, judging whether or not communication state of the first terminal changes by the message; and
updating the status management information of the first terminal registered in the signaling server without transferring the message to the first terminal, when it is judged that the first terminal requires the signaling processing support and judged that the message is not directly related to starting or stopping of communication with the first terminal.

12. The signaling processing proxy method as claimed in claim 11, comprising updating the status management information and returning a temporary response to a second terminal at the same time, when the message is not transferred to the first terminal in updating the status management information.

13. The signaling processing proxy method as claimed in claim 12, comprising:
the first terminal transmitting a signaling processing support request to the signaling server; and
the signaling server updating the registered terminal list indicating that the first terminal requires the signaling processing support, in response to the signaling processing support request from the first terminal.

14. The signaling processing proxy method as claimed in claim 12, comprising:
the signaling server generating a timer event according to timer information that is contained in the status management information; and
the signaling processing part transmitting a message by responding to the timer event.

15. The signaling processing proxy method as claimed in claim 14, comprising:
the first terminal transmitting the signaling processing support request and the timer information to the signaling server; and the signaling processing part having the status management part record the timer information in the status management information by responding to the signaling processing support request.

16. A non-transitory computer readable recording medium storing a signaling processing proxy program for allowing a signaling server, which is mutually connected to a plurality of terminals via a network for performing data communication and has a registered terminal list and status management information of the plurality of terminals, including a first terminal, to execute:

receiving processing for receiving a message directed to the first terminal from a second terminal;

searching processing for searching the first terminal from the registered terminal list;

first judgment processing for judging whether or not the first terminal requires a signaling processing support based on contents searched in the searching processing;

following the first judgment processing, second judgment processing for judging whether or not communication state of the first terminal changes by the message; and status management processing for updating the status management information of the first terminal registered in the signaling server without transferring the message to the first terminal, when it is judged in the first judgment processing that the first terminal requires the signaling processing support and judged in the second judgment processing that the message is not directly related to starting or stopping of communication with the first terminal.

* * * * *